(12) United States Patent
Tsuji et al.

(10) Patent No.: US 9,982,716 B2
(45) Date of Patent: May 29, 2018

(54) SYNTHETIC RESIN RETAINER AND BALL BEARING

(71) Applicant: NTN CORPORATION, Osaka (JP)

(72) Inventors: Naoaki Tsuji, Mie (JP); Hikaru Ishida, Mie (JP)

(73) Assignee: NTN CORPORATION, Osaka (JP)

( * ) Notice: Subject to any disclaimer, the term of this patent is extended or adjusted under 35 U.S.C. 154(b) by 0 days. days.

(21) Appl. No.: 15/520,587

(22) PCT Filed: Oct. 13, 2015

(86) PCT No.: PCT/JP2015/078884
§ 371 (c)(1),
(2) Date: Apr. 20, 2017

(87) PCT Pub. No.: WO2016/072223
PCT Pub. Date: May 12, 2016

(65) Prior Publication Data
US 2017/0314619 A1 Nov. 2, 2017

(30) Foreign Application Priority Data

Nov. 4, 2014 (JP) ................................. 2014-224195

(51) Int. Cl.
*F16C 33/38* (2006.01)
*F16C 19/06* (2006.01)

(52) U.S. Cl.
CPC .......... *F16C 33/3875* (2013.01); *F16C 19/06* (2013.01); *F16C 33/3887* (2013.01); *F16C 2208/60* (2013.01)

(58) Field of Classification Search
CPC ... F16C 19/06; F16C 33/3875; F16C 33/3887
See application file for complete search history.

(56) References Cited

U.S. PATENT DOCUMENTS 3,586,405 A 6/1971 Claesson
4,558,961 A * 12/1985 Fernlund ............. F16C 33/3875
384/526
(Continued)

FOREIGN PATENT DOCUMENTS

JP 37-16912 7/1962
JP 47-19123 6/1972
(Continued)

OTHER PUBLICATIONS

International Search Report dated Jan. 12, 2016 in corresponding International (PCT) Application No. PCT/JP2015/078884.
(Continued)

*Primary Examiner* — Phillip A Johnson
(74) *Attorney, Agent, or Firm* — Wenderoth, Lind & Ponack, L.L.P.

(57) ABSTRACT

A synthetic resin retainer includes two annular members having opposed surfaces opposed to each other and each formed with a plurality of pockets which are circumferentially spaced apart from each other, and in which the balls are received. Each annular member includes axially concave, arc-shaped pocket wall portions defining the inner surfaces of the pockets, and flat plate-shaped coupling plate portions coupling together the adjacent pairs of the pocket wall portions. The coupling plate portions have axial thicknesses of 30% or less of the diameters of the balls, and the pocket wall portions have, at deepest points of the pockets, thicknesses of 10% or less of the diameters of the balls.

9 Claims, 5 Drawing Sheets

(56) References Cited

U.S. PATENT DOCUMENTS

| 9,022,662 B2 | 5/2015 | Ito et al. |
| 2014/0112608 A1* | 4/2014 | Ito .......................... F16C 19/06 384/527 |

FOREIGN PATENT DOCUMENTS

| JP | 2006-226448 | 8/2006 |
| JP | 2007-332994 | 12/2007 |
| JP | 2008-64157 | 3/2008 |
| JP | 2012-2243 | 1/2012 |
| JP | 2013-7468 | 1/2013 |

OTHER PUBLICATIONS

International Preliminary Report on Patentability dated May 9, 2017 in corresponding International (PCT) Application No. PCT/JP2015/078884.

* cited by examiner

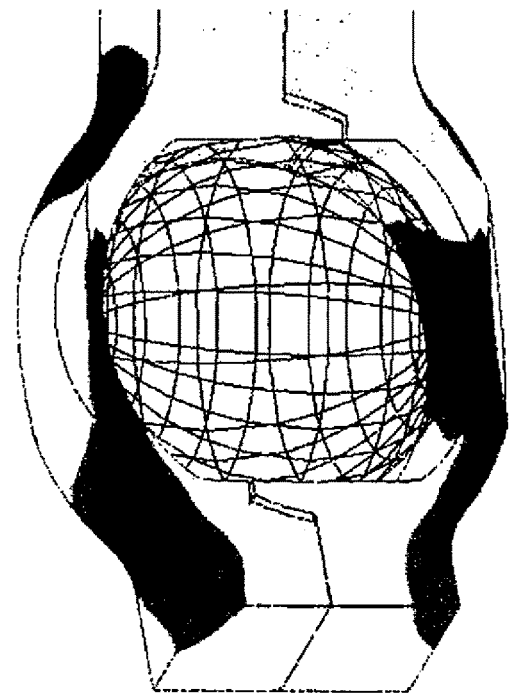
FIG. 4 (a)
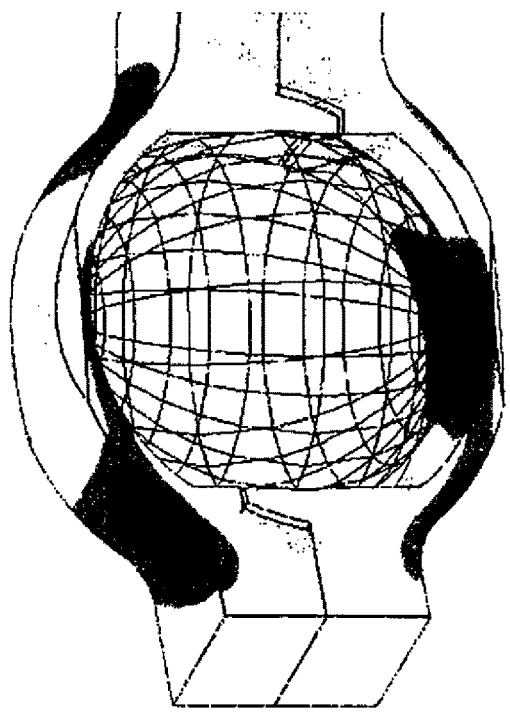
FIG. 4 (b)
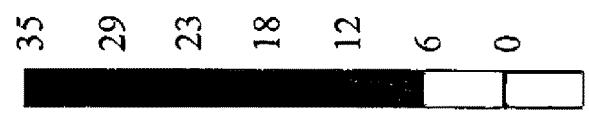

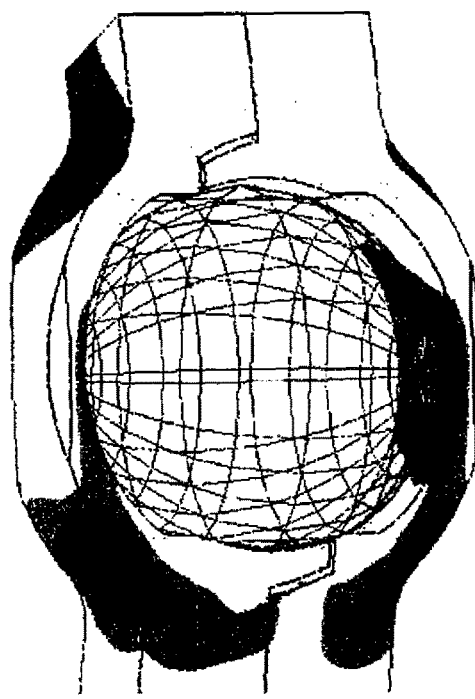
FIG. 5 (b)
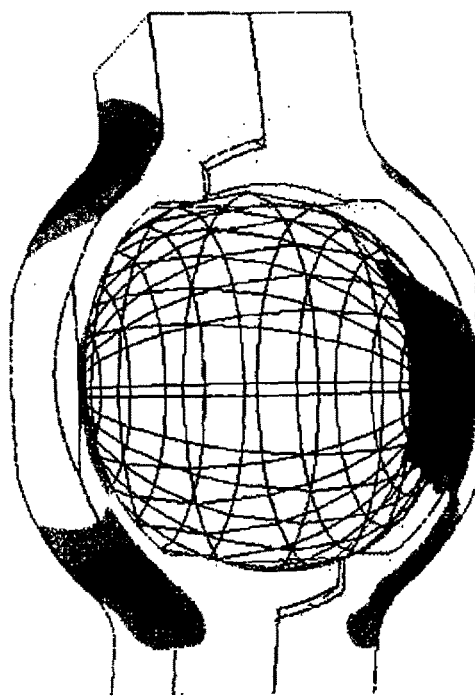
FIG. 5 (a)
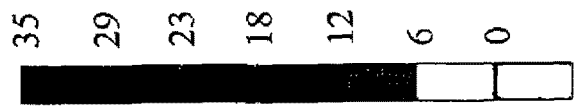

US 9,982,716 B2

SYNTHETIC RESIN RETAINER AND BALL BEARING

TECHNICAL FIELD

This invention relates to a synthetic resin retainer made of synthetic resin, and a ball bearing using this synthetic resin retainer.

BACKGROUND ART

Typically, ball bearings include an inner race, an outer race, a plurality of balls disposed between the inner race and the outer race and circumferentially spaced apart from each other, and a retainer retaining the balls. While metal retainers were used in many of older ball bearings for use in motors because metal retainers are high in rigidity, synthetic resin retainers are increasingly used in recent ball bearings because synthetic resin retainers are quieter and lighter in weight than metal retainers.

A synthetic resin retainers are disclosed, e.g., in JP Patent Publication 2006-226448A and JP Patent Publication 2008-064157A. The synthetic resin retainer disclosed in either of JP Patent Publication 2006-226448A or JP Patent Publication 2008-064157A comprises two axially opposed annular members made of synthetic resin, and each formed with a plurality of circumferentially spaced apart pockets in which the balls are received.

The two annular members of the synthetic resin retainer disclosed in JP Patent Publication 2006-226448A have axially concave arc-shaped pocket wall portions defining the inner surfaces of the pockets in which the balls are received, and a flat plate-shaped coupling plate portions coupling together the adjacent pocket wall portions. The two annular members are ordinarily formed by injection-molding a material comprising a thermoplastic resin such as polyamide to which is added 20-30% by weight of a reinforcing fiber material such as glass fibers.

The axial thicknesses of the coupling plate portions of this type of conventional synthetic resin retainers are about 32-33% of the diameters of the balls, while the axial thicknesses of the pocket wall portions are about 12-15% of the diameters of the balls.

On the other hand, in view of the fact that synthetic resin retainers are lower in strength than metal retainers, synthetic resin retainers are proposed of which the two annular members have increased thicknesses. For example, the synthetic resin retainer disclosed in JP Patent Publication 2008-064157A includes reinforcing walls integral with the coupling plate portions and coupling together the adjacent pocket wall portions in order to increase the strength of the synthetic resin retainer. The reinforcing walls increase the substantive axial thicknesses of the annular members, thus increasing the strength of the synthetic resin retainer.

In designing a synthetic resin retainer comprising the above-described two annular members, the inventor of the present application tried to find an optimal shape of the retainer in preventing damage to the retainer due to stress generated while the bearing is rotating. For this purpose, the inventor conducted a finite element method (hereinafter referred to "FEM") analysis for annular members each having pockets wall portions and coupling plate portions of which the axial thicknesses are different from the axial thicknesses of those of the other annular members, and studied the results of analysis.

The results of this study revealed that, while it had been considered that the two annular members have to have large thicknesses for increased strength of the retainer, by reducing the thicknesses of the two annular members, stress concentration becomes less likely to occur, so that it is possible to effectively prevent damage to the retainer due to stress generated while the bearing is rotating.

This is presumably for the following reasons. That is, while a bearing is rotating, circumferential pushing forces act between the balls and the retainer due to the balls moving faster or slower than the retainer. If the two annular members have large thicknesses as in the conventional retainers, stress due to the circumferential pushing forces tends to concentrate on portions of the retainer which are shaped such that they are relatively easily deformable (e.g., bent portions of the retainer where the pocket wall portions are connected to the coupling plate portions, and portions of the pocket wall portions where the pockets are the deepest). On the other hand, by reducing the thicknesses of the two annular members, when circumferential pushing forces act on the retainer due to the balls moving faster or slower than the retainer, stress due to the circumferential pushing forces is dispersed throughout the retainer and is less likely to concentrate on limited portions of the retainer, thus reducing the possibility of damage to the retainer.

SUMMARY OF THE INVENTION

An object of the present invention is to provide a synthetic resin retainer which is less likely to be damaged due to the balls moving faster or slower than the retainer while the bearing is rotating.

In order to achieve this object, the present invention provides a synthetic resin retainer comprising two annular members made of synthetic resin and axially opposed to each other The two annular members have opposed surfaces opposed to each other and each formed with a plurality of pockets which are circumferentially spaced apart from each other, and in which balls are received Each of the annular members comprises axially concave, arc-shaped pocket wall portions defining inner surfaces of the pockets, and flat plate-shaped coupling plate portions each coupling together an adjacent pair of the pocket wall portions The coupling plate portions have axial thicknesses of 30% or less of the diameters of the balls, and the pocket wall portions have, at the deepest points of the pockets, thicknesses of 10% or less of the diameters of the balls.

With this arrangement, since the thicknesses of the two annular members forming the retainer are small, when circumferential pushing forces act on the retainer due to the balls moving faster or slower than the retainer, the retainer is flexibly deformed, so that stress is dispersed and thus does not concentrate on limited portions of the retainer. This in turn reduces the possibility of damage to the retainer clue to the balls moving faster or slower than the retainer while the bearing is rotating.

The axial thicknesses of the coupling plate portions may be within a range of 15-28% of the diameters of the balls, and the thicknesses of the pocket wall portions at the deepest points of the pockets may be within a range of 5-8% of the diameters of the balls.

With this arrangement, it is possible to effectively prevent stress concentration when pushing forces act on the retainer due to the balls moving faster or slower than the retainer while the bearing is rotating, and simultaneously ensure strength of the retainer.

The pocket wall portions may be arranged and shaped such that portions of the inner surfaces of the respective pockets including the deepest points of the pockets are cylindrical surfaces each having a center axis extending in the radial direction of the annular members.

With this arrangement, compared with the arrangement in which portions of the inner surfaces of the pockets including the deepest points of the pockets are concave spherical surfaces, the portions of the pocket wall portions where the pockets are the deepest are flexible. Thus, this arrangement more effectively prevents stress concentration on the portions of the retainer where the pocket wall portions are connected to the coupling plate portions.

By using the above-described dimensions, it is possible to keep the intensity of a main stress generated at a portion of the synthetic resin retainer where the main stress is maximum to 32 MPa or less, when a pressing force equal to 150 times the mass of each of the balls is applied from the ball to the corresponding one of the coupling plate portions due to the ball moving faster or slower than the synthetic resin retainer while the bearing is rotating.

The present invention also provides a ball bearing comprising an inner race, an outer race, a plurality of balls disposed between the inner race and the outer race so as to be circumferentially spaced apart from each other, and a retainer retaining the balls, wherein the retainer is the above-described synthetic resin retainer.

Advantages of the Invention

Since the two annular members forming the synthetic resin retainer according to the present invention are small in thickness, when circumferential pushing forces act on the retainer due to the balls moving faster or slower than the retainer, the retainer is flexibly deformed, so that stress is dispersed and thus does not concentrate on limited portions of the retainer. This in turn reduces the possibility of damage to the retainer due to the balls moving faster or slower than the retainer while the bearing is rotating.

BRIEF DESCRIPTION OF THE DRAWINGS

FIG. 4(a) shows the results of FEM analysis of main stress distribution when a circumferential pressing force is applied to the retainer shown in FIG. 3 due to the ball moving faster or slower than the retainer while the bearing is rotating, as viewed from radially inside of the retainer; and FIG. 4(b) shows the results of FEM analysis of main stress distribution when a circumferential pressing force is applied to a retainer of a comparative example due to the ball moving faster or slower than the retainer while the bearing is rotating, as viewed from radially inside of the retainer.

FIG. 5(a) shows main stress distribution when the retainer of FIG. 4(a) is viewed from radially outside of the retainer; and FIG. 5(b) shows main stress distribution when the retainer of FIG. 4(b) is viewed from radially outside of the retainer.

DETAILED DESCRIPTION THE INVENTION

Figure 1:
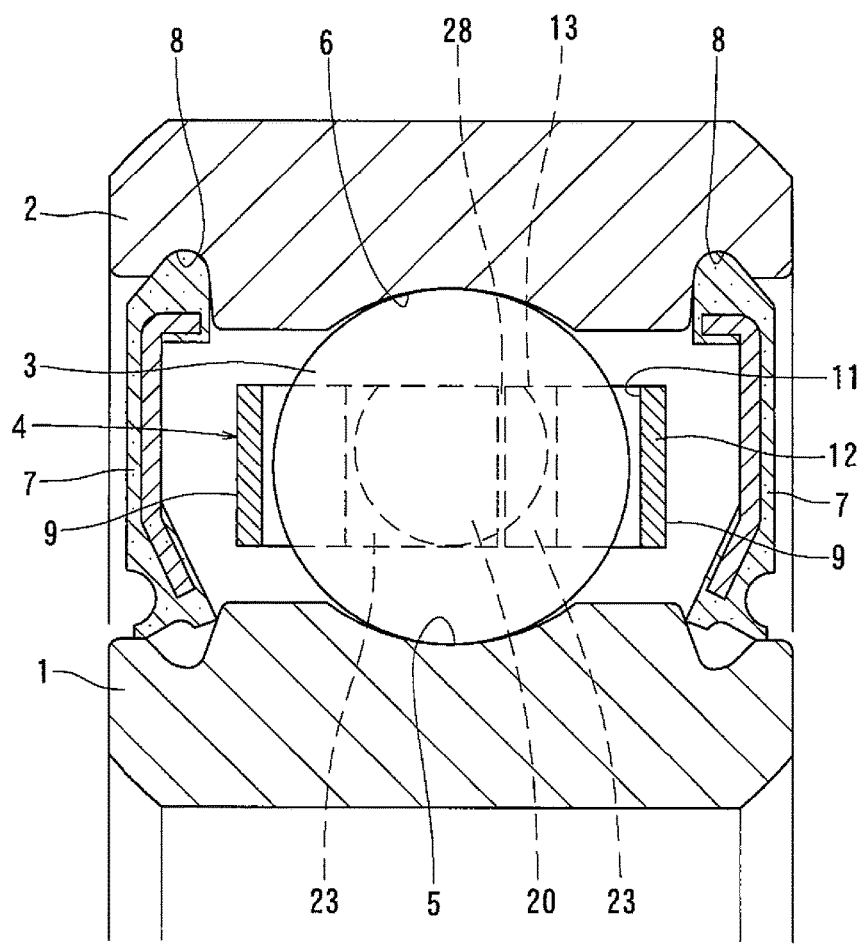
FIG. 1 is a sectional view of a ball bearing in which a synthetic resin retainer embodying the present invention is mounted.

FIG. 1 shows a ball bearing using a synthetic resin retainer made of a synthetic resin embodying the present invention. The ball bearing includes an inner race 1, an outer race 2, a plurality of balls 3 disposed between the inner race 1 and the outer race 2 and spaced apart from each other, and a retainer 4 retaining the balls 3.

The inner race 1 has on its outer periphery a circumferentially extending raceway groove 5 having a circular arc-shaped cross-section, while the outer race 2 has on its inner periphery a circumferentially extending raceway groove 6 having a circular arc-shaped cross-section such that the balls 3, which are made of steel, roll in the raceways 5 and 6.

Two seal members 7 are provided between the inner race 1 and the outer race 2 and are axially opposed to each other, with the balls 3 and the retainer 4 disposed between the seal members 7. The seal members 7 are each fixed at its outer peripheral portion in a seal groove 8 formed in one of the shoulders of the raceway groove 6 of the outer race 2. The seal members 7 have inner peripheral portions in sliding contact with the outer periphery of the inner race 1. Thus, the seal members 7 prevent grease sealed in the annular space between the inner race 1 and the outer race 2 from leaking out of the ball bearing.

Figure 2:
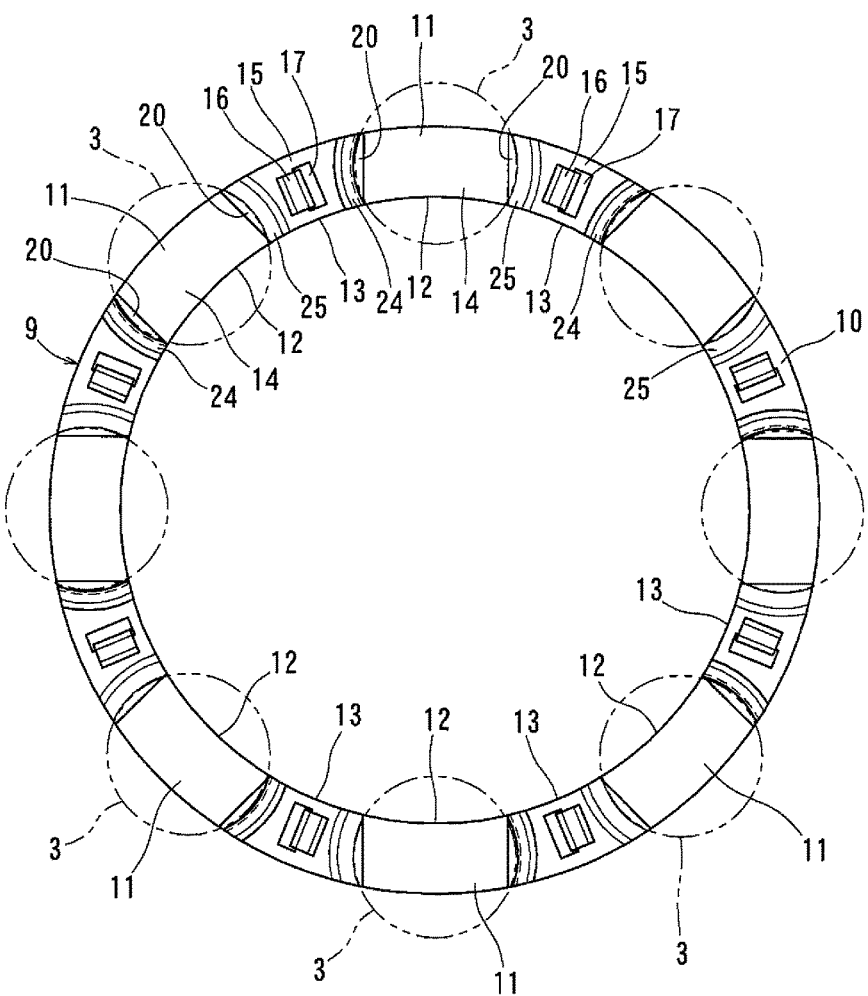
FIG. 2 shows one of two annular members forming the retainer shown in FIG. 1, as viewed from its surface opposed to the other of the annular members.

The retainer 4 comprises two annular members 9 axially opposed to each other. As shown in FIG. 2, the two annular members 9 have opposed surfaces 10 opposed to each other and formed with a plurality of pockets 11 arranged at equal intervals in the circumferential direction to receive the balls 3 therein.

The annular members 9 are formed by injection molding of a synthetic resin, and are identical in shape, so that they can be formed using a common mold. While the synthetic resin used to form the annular members 9 is ordinarily a polyamide (such as PA46), polyphenylene sulfide (PPS) or polyetheretherketone (PEEK) may be used instead of a polyamide. For added strength, 20-30% by weight of glass fibers are ordinarily added to the synthetic resin used to form the annular members 9. However, instead of glass fibers, other fibers such as carbon fibers or aramid fibers may be added.

Figure 3:
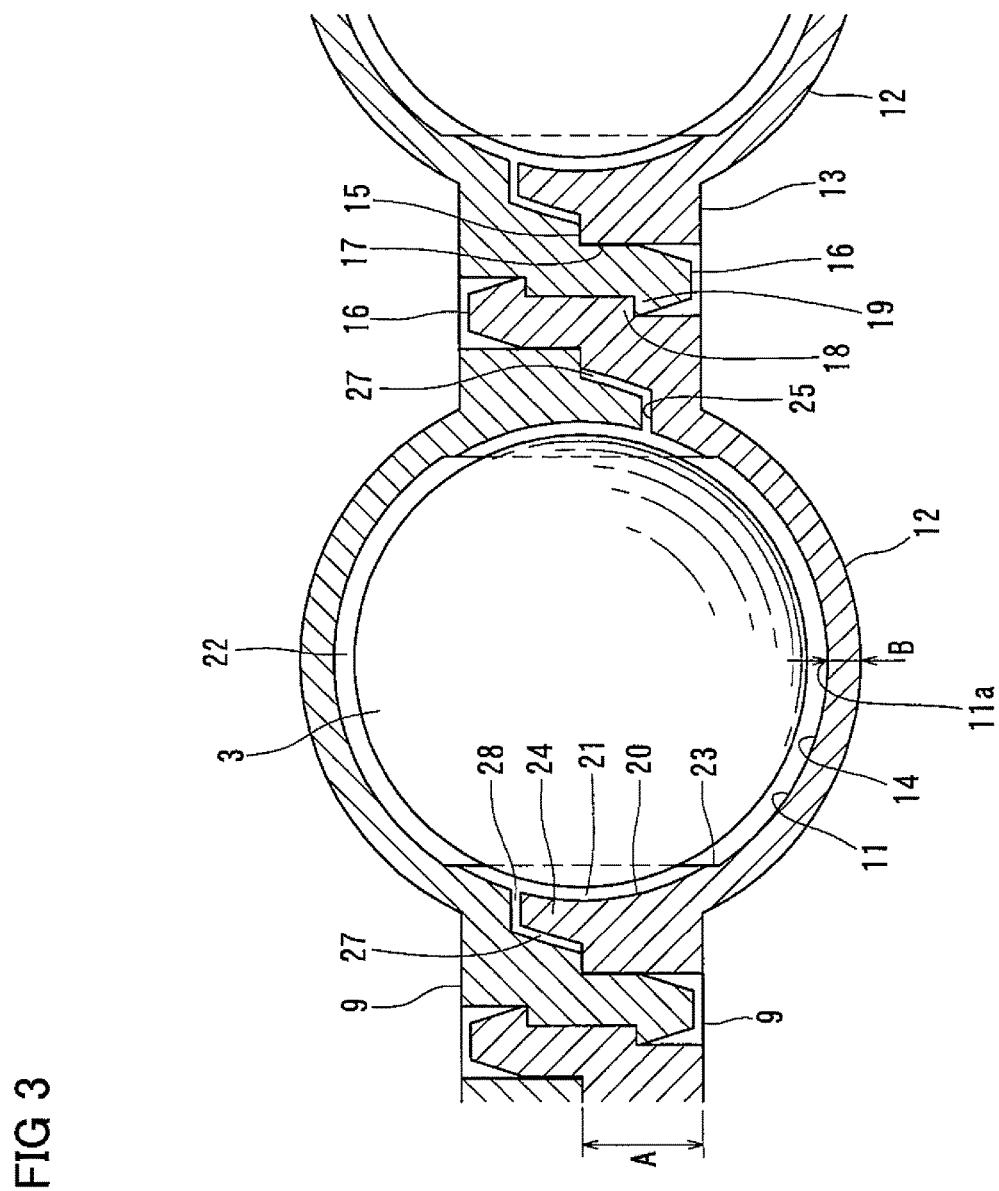
FIG. 3 is a sectional view of the retainer shown in FIG. 1, as viewed from radially inside of the retainer along an imaginary cylindrical surface including the pitch circle of the balls.

As shown in FIG. 3, each annular member 9 comprises arc-shaped pocket wall portions 12 each defining a portion of the inner surface of one of the pockets 11, and flat coupling plate portions 13 coupling together the adjacent pocket wall portions 12. The pocket wall portions 12 are arranged at equal intervals in the circumferential direction of the annular member 9.

The pocket wall portions 12 are axially concave, arc-shaped portions, and are shaped and arranged such that the inner surface of each pocket 11 including its deepest points 11a forms a cylindrical surface 14 having a center axis extending in the radial direction of the annular members 9. Each pocket wall portion 12 may be in the form of a partial cylinder having a constant thickness. The pocket wall portions 12 serve to restrict axial movements of the balls 3, which are received in the pockets 11, while the coupling plate portions 13 restrict circumferential movements of the balls 3.

The coupling plate portions 13 of each annular member 9 have mating surfaces 15 configured to be brought into surface contact with the opposed mating surfaces 15 when the two annular members 9 are joined together. Each mating surface 15 is formed at its central portion with an axially protruding joint claw 16, and a joint hole 17 configured to receive the joint claw 16 of the opposed mating surface 15. The joint claws 16 each have a hook portion 19 configured to engage a stepped portion 18 formed on the inner surface of the corresponding joint hole 17. With this arrangement, when the two annular members 9 are moved axially toward each other until the joint claws 16 are inserted into the joint holes 17, the hook portions 19 engage the respective stepped portions 18 such that the joint claws 16 are prevented from being pulled out of the joint holes 17, and the two annular members 9 are joined together.

Each coupling plate portion 13 has two circumferential ends formed with concave spherical surfaces 20 extending along the outer peripheries of the balls 3 and configured to guide the balls 3 in the pockets 11. The circumferential gaps 21 between the concave spherical surfaces 20 and the balls 3 are set to be smaller than the axial gaps 22 between the cylindrical surfaces 14 and the balls 3. A flat surface 23 (see FIG. 1) is formed around each concave spherical surface 20 to connect the concave spherical surface 20 with the cylindrical surface 14.

The coupling plate portions 13 of each annular member 9 each have, at one end of the mating surface 15, an axially extending protruding wall portion 24, and, at the other end of the mating surface 15, a receiving recess 25 configured to receive the corresponding protruding wall portion 24 of the other annular member 9 when the two annular members 9 are joined together. By providing the coupling plate portions 13 with the protruding wall portions 24 and the receiving recesses 25, when the two annular members 9 are joined together, mating lines form therebetween that are displaced from the axial centers of the pockets 11. This prevents the balls 3 from coming into contact with the mating lines between the two annular members 9 when the balls 3 move faster or slower than the retainer during rotation of the bearing, thus making it possible to stably retain the balls 3.

The protruding wall portions 24 and the receiving recesses 25 are sized such that with the two annular members 9 joined together, circumferential and axial gaps 27 and 28 form between the protruding wall portions 24 and the receiving recesses 25. In particular, with the two annular members 9 joined together, a circumferential gap 27 forms between the side surface of each protruding wall portion 24 opposite from the concave spherical surface 20 and the inner surface of the receiving recess 25, and an axial gap 28 forms between the axial distal end of the protruding wall portion 24 and the concave spherical surface 20. The gaps 27 and 28 prevent interference between the protruding wall portions 24 and the receiving recesses 25 due to differential shrinkage when the annular members 9 are formed by injection molding, thus allowing the mating surfaces 15 of the coupling plate portions 13 of the respective annular members 9 to be reliably brought into close contact with each other.

The coupling plate portions 13 have axial thicknesses A (axial thicknesses except their portions formed with the joint claws 16) within the range of 13-30%, preferably 15-28%, of the diameters of the balls 3. The pocket wall portions 12 have thicknesses B at the deepest points 11a of the pockets 11 within the range of 4-10%, preferably 5-8%, of the diameters of the balls 3.

Since retainers 4 made of synthetic resin are usually low in strength compared with retainers made of metal, it was an ordinary practice to design a synthetic resin retainer 4 such that the two annular members 9 of the retainer 4 have increased thicknesses for increased strength.

Conversely, however, the two annular members 9 forming the synthetic resin retainer 4 of this embodiment have relatively small thicknesses based on the discovery that as is apparent from the below-described results of FEM analysis, by setting the thicknesses of the annular members 9 to relatively small values, stress concentration is less likely to occur, so that it is possible to effectively prevent damage to the retainer 4 due to stress during operation of the bearing.

FIGS. 4(a) and 5(a) show the main stress distribution, as analyzed by FEM, when a circumferential pressing force is applied from a ball 3 to the synthetic resin retainer 4 of the above embodiment due to the ball 3 moving faster or slower than the retainer while the bearing is rotating. The FEM analysis shows the main stress distribution when a pressing force equal to 150 times the mass of the ball 3 is applied from the ball 3 to the coupling plate portions 13. The main stresses are vertical stresses in the coordinate system in which the shear stress components are zero. The models of coupling plates 13 used in this FEM analysis have axial thicknesses A of about 28% of the diameter of the ball 3, and the models of pocket wall portions 12 have thicknesses B of about 8% of the diameter of the ball 3. FIGS. 4(a) and 5(a) show the main stress distribution when the retainer 4 is seen from radially inside, and radially outside, of the retainer 4, respectively.

FIGS. 4(b) and 5(b) show the main stress distribution, as analyzed by FEM, when a circumferential pressing force is applied from a ball 3 to a synthetic resin retainer of a comparative example due to the ball 3 moving faster or slower than the retainer while the bearing is rotating. The models of coupling plates 13 used in this FEM analysis have axial thicknesses of about 32% of the diameter of the ball 3, and the models of pocket wall portions 12 have thicknesses of about 12% of the diameter of the ball 3. FIGS. 4(b) and 5(b) show the main stress distribution when the retainer 4 is seen from radially inside, and radially outside, of the retainer 4, respectively.

When comparing the results of the above two FEM analyses, in FIGS. 4(b) and 5(b), which show the synthetic resin retainer of the comparative example, at portions of the retainer where the main stress becomes maximum, the main stress reached as high as about 29-35 MPa. In contrast, in FIGS. 4(a) and 5(a), which show the synthetic resin retainer 4 of the above embodiment, even at portions of the retainer where the main stress becomes maximum (i.e., at bent portions of the retainer where the pocket wall portions 12 are connected to the coupling plate portions 13, and at portions of the pocket wall portions 12 where the pockets 11 are the deepest), the main stress remained at a low level of about 18-23 MPa. If the synthetic resin retainers of the embodiment and the comparative example are formed of a synthetic resin composition comprising PA46 to which is added 20-30% by weight of glass fibers, since the fatigue limit of this synthetic resin composition is about 32 MPa, it is apparent that the retainer of the embodiment, which is subjected to a maximum main stress of less than 32 MPa, is far less likely to be damaged than the retainer of the comparative example, which is subjected to a maximum main stress exceeding 32 MPa. The fatigue limit is defined in "General rules of fatigue test method of hard plastic materials" in Japan Industrial Standards JISK7118-1995, and is a limit value of the stress below which the subject withstands the stress when the stress is applied $10^7$ times.

The above results of FEM analyses thus indicate that stress concentration is less likely to occur in the synthetic resin retainer of the embodiment, of which the annular members are relatively small in thickness, than in the synthetic resin retainer of the comparative example, of which the annular members are relatively large in thickness. This makes it possible to effectively prevent damage to the retainer 4 of the embodiment due to stress generated while the bearing is rotating.

Stress concentration is less likely to occur in the retainer of the embodiment presumably for the following reasons. That is, a retainer of which the two annular members are relatively large in thickness, like the one of the comparative example, is high in rigidity as a whole, but the high rigidity also tends to cause stress concentration on the portions of the retainer which are shaped such that they are relatively easily deformable. In contrast, a retainer of which the two annular members 9 are small in thickness, like the retainer 4 of the embodiment, is flexibly deformable, so that stress is dispersed throughout the retainer, and is less likely to concentrate on limited portions of the retainer.

As described above, since the two annular members 9 constituting the synthetic resin retainer 4 of the embodiment are small in thickness, when circumferential pressing forces are applied the balls 3 to the retainer 4 due to the balls 3 moving faster or slower than the retainer 4, the retainer 4 is flexibly deformed, so that stress is dispersed throughout the retainer and is less likely to concentrate on limited portions of the retainer. This reduces the possibility of damage to the retainer due to the balls 3 moving faster or slower than the retainer while the bearing is rotating.

Since the pocket wall portions 12 of the synthetic resin retainer 4 of the embodiment are arranged such that portions of the inner surfaces of the pockets 11 including the deepest points 11a of the pockets 11 are cylindrical surfaces 14 having center axes extending in the radial direction of the annular members 9, the portions of the pocket wall portions 12 where the pockets 11 are the deepest are flexible compared with an arrangement in which portions of the inner surfaces of the pockets 11 including the deepest points 11a of the pockets 11 are concave spherical surfaces. Thus, this arrangement more effectively prevents stress concentration on the portions of the retainer where the pocket wall portions 12 are connected to the coupling plate portions 13.

While the above embodiment shows a synthetic resin retainer 4 of which the two annular members 9 are joined together by the joint claws 16 and the joint holes 17, this invention is also applicable to a synthetic resin retainer of which the coupling plate portions 13 of the two respective annular members 9 are joined together by rivets.

It is to be understood that the above embodiment is a mere example, and not intended to limit the present invention. The scope of the present invention is defined not by the above description of the present invention but by the claims. The present invention covers every modification which is considered to be within the scope of the claims, or which is considered to be an equivalent of the claims.

DESCRIPTION OF THE REFERENCE NUMERALS AND LETTERS

1. Inner race
2. Outer race
3. Ball
4. Retainer
9. Annular member
10. Opposed surface
11. Pocket
11a. Deepest point of the pocket
12. Pocket wall portion
13. Coupling plate portion
14. Cylindrical surface
A, B. Thickness

What is claimed is:

1. A synthetic resin retainer comprising:
   two annular members made of synthetic resin and axially opposed to each other,
   wherein the two annular members have opposed surfaces opposed to each other, and each of the annular members is formed with a plurality of pockets which are circumferentially spaced apart from each other, and in which balls are received,
   each of the annular members comprising axially concave, arc-shaped pocket wall portions defining inner surfaces of the pockets, and flat plate-shaped coupling plate portions each coupling together an adjacent pair of the pocket wall portions,
   wherein the coupling plate portions have axial thicknesses of 30% or less of diameters of the balls, and
   the pocket wall portions have, at deepest points of the pockets, thicknesses of 10% or less of the diameters of the balls.

2. The synthetic resin retainer of claim 1, wherein the axial thicknesses of the coupling plate portions are within a range of 15-28% of the diameters of the balls, and
   the thicknesses of the pocket wall portions at the deepest points of the pockets are within a range of 5-8% of the diameters of the balls.

3. The synthetic resin retainer of claim 2, wherein the pocket wall portions are arranged and shaped such that portions of the inner surfaces of the respective pockets including the deepest points of the pockets are cylindrical surfaces each having a center axis extending in a radial direction of the annular members.

4. The synthetic resin retainer of claim 3, wherein the balls are elements of a bearing, and wherein the synthetic resin retainer is configured such that when a pressing force equal to 150 times a mass of each of the balls is applied from the ball to a corresponding one of the coupling plate portions due to the ball moving faster or slower than the synthetic resin retainer while the bearing is rotating, an intensity of a main stress generated at a portion of the synthetic resin retainer where the main stress is maximum is 32 MPa or less.

5. The synthetic resin retainer of claim 2, wherein the balls are elements of a bearing, and wherein the synthetic resin retainer is configured such that when a pressing force equal to 150 times a mass of each of the balls is applied from the ball to a corresponding one of the coupling plate portions due to the ball moving faster or slower than the synthetic resin retainer while the bearing is rotating, an intensity of a main stress generated at a portion of the synthetic resin retainer where the main stress is maximum is 32 MPa or less.

6. The synthetic resin retainer of claim 1, wherein the pocket wall portions are arranged and shaped such that portions of the inner surfaces of the respective pockets including the deepest points of the pockets are cylindrical surfaces each having a center axis extending in a radial direction of the annular members.

7. The synthetic resin retainer of claim 6, wherein the balls are elements of a bearing, and wherein the synthetic resin retainer is configured such that when a pressing force equal to 150 times a mass of each of the balls is applied from the ball to a corresponding one of the coupling plate portions due to the ball moving faster or slower than the synthetic resin retainer while the bearing is rotating, an intensity of a main stress generated at a portion of the synthetic resin retainer where the main stress is maximum is 32 MPa or less.

8. The synthetic resin retainer of claim 1, wherein the balls are elements of a bearing, and wherein the synthetic resin retainer is configured such that when a pressing force equal to 150 times a mass of each of the balls is applied from the ball to a corresponding one of the coupling plate portions due to the ball moving faster or slower than the synthetic resin retainer while the bearing is rotating, an intensity of a main stress generated at a portion of the synthetic resin retainer where the main stress is maximum is 32 MPa or less.

9. A ball bearing comprising an inner race, an outer race, a plurality of balls disposed between the inner race and the outer race so as to be circumferentially spaced apart from each other, and the synthetic resin retainer of claim 1 retaining the balls.

* * * * *